Patented Nov. 22, 1927.

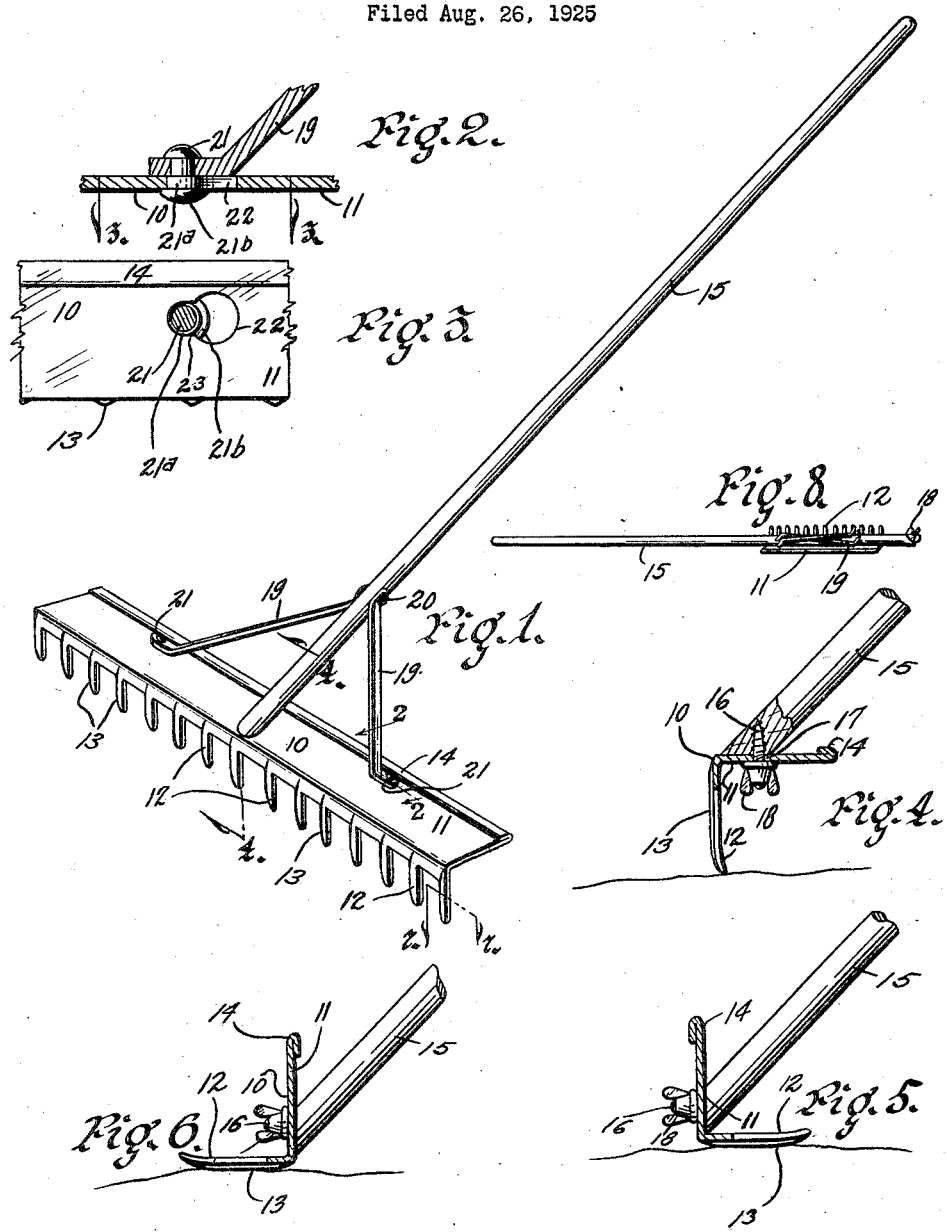

1,650,428

UNITED STATES PATENT OFFICE.

HERBERT J. L. CHINNECK, OF BOONE, IOWA.

LAWN RAKE.

Application filed August 26, 1925. Serial No. 52,569.

The object of my invention is to provide a rake of durable and inexpensive construction.

A further object is to provide such a rake having a sheet metal blade.

Still a further object is to provide a rake of particular construction, which may be adjusted relative to the handle for performing a variety of operations.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 is a perspective view of my improved rake.

Figure 2 is a sectional view on the line 2—2 of Figure 1.

Figure 3 is a sectional view on the line 3—3 of Figure 2.

Figure 4 is a sectional view on the line 4—4 of Figure 1.

Figures 5 and 6 are sectional views similar to Figure 4 showing the blade adjusted to different positions.

Figure 7 is a sectional view on the line 7—7 of Figure 1; and

Figure 8 shows the relation of the parts of my rake when bundled for shipment.

In the accompanying drawings, I have used the reference numeral 10 to indicate generally the back of my rake. Formed thereon and arranged at right angles to the back 11 is the toothed portion 12.

The teeth 12 have depressions 13 formed on their longitudinal centers, which form reinforcements for them to prevent bending of the teeth when in use. The portion 11 has a reinforcing bead 14.

I provide a handle 15 for my rake and a blade 10 which is attached thereto in the following manner: A screw 16 is secured in the end of the handle 15 as clearly shown in Figure 4. The projecting end of the screw 16 is received in an opening 17 in the back 10 and is screw-threaded to receive a wing nut 18 for the purpose of retaining the back 10 on the handle 15.

I provide braces 19 for the back 10, and they are riveted at 20 to the handle 15. Their opposite ends have rivets 21 which are shouldered, as clearly shown in Figure 2. The enlarged portion 21ª is received in a keyhole slot in the blade 10. This slot is clearly shown in Figure 3 and comprises a large hole 22 and a slot 23.

The braces 19 are detachably secured to the back 10 by the above described arrangement. The heads 21ᵇ of the rivets 21 are inserted through the openings 22, and the wing nut 18 is tightened on the screw 16. This causes the lower ends of the braces 19 to spread, and the portion 21ª of the rivet 21 enters the slot 23.

In the ordinary raking operations, the back 10 is adjusted to the position shown in Figure 6.

The rake is pushed along the ground and the leaves are shoved into piles.

On a clipped or short grass level lawn this is the desirable position and use of the rake and the work can be done more quickly than with an ordinary rake.

When used with the adjustment shown in Figure 6, the rake can be used in the manner of a pitch fork for piling or handling leaves etc. The rake when in this position of adjustment can also be used as a snow shovel, or for handling loose dirt and so on.

The blade can be turned over as in Figure 5, and also be used as a rake. In either position, I find that when raking leaves out of a lawn, the grass is not torn up as when using a regular rake.

When it is desired to use the rake as a scraper or for shoving snow off side walks, etc., the blade is adjusted, as shown in Figures 5 or 6.

By the connecting of the parts together, my rake can be easily bundled in the manner shown in Figure 8. This is desirable for the conservation of space when shipping and so forth.

It will thus be seen that I have provided a rake having a variety of uses, and which can be durably and inexpensively manufactured by forming it from sheet metal.

Some changes may be made in the construction and arrangement of the various parts of my invention, without departing from the real spirit and purpose of my invention, and it is my intention to cover by my claim, any modified forms of structure or use of mechanical equivalents, which may be reasonably included within their scope.

I claim as my invention:

In a lawn rake of the kind described; a rake having a back in the form of a substantially flat strip and a toothed portion projecting therefrom at substantially right angles thereto, said back having longitudinally spaced bayonet slots with their narrow portions farthest apart and having a hole between said bayonet slots, a handle having a beveled end adapted to rest against the back of said rake on either side thereof, a pair of braces detachably secured to said handle at a point spaced from its end adjacent to the rack and diverging from said handle and terminating in feet adapted to rest against the back of the rake, said feet being provided with shouldered members adapted to be received in said slots, a threaded member projecting from the beveled end of said handle, and a nut for coacting with said threaded member.

HERBERT J. L. CHINNECK.